US012603379B2

(12) United States Patent (10) Patent No.: US 12,603,379 B2
Liu et al. (45) Date of Patent: Apr. 14, 2026

(54) ENERGY STORAGE SYSTEM

(71) Applicant: CONTEMPORARY AMPEREX TECHNOLOGY (HONG KONG) LIMITED, Hong Kong (CN)

(72) Inventors: Yue Liu, Ningde City (CN); Zengzhong Wang, Ningde City (CN); Chenling Zheng, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 597 days.

(21) Appl. No.: 18/095,948

(22) Filed: Jan. 11, 2023

(65) Prior Publication Data

US 2023/0238640 A1 Jul. 27, 2023

Related U.S. Application Data

(63) Continuation of application No. PCT/CN2022/073236, filed on Jan. 21, 2022.

(51) Int. Cl.
*H01M 50/325* (2021.01)
*H01M 10/658* (2014.01)
(Continued)

(52) U.S. Cl.
CPC ....... *H01M 50/325* (2021.01); *H01M 10/658* (2015.04); *H01M 50/271* (2021.01);
(Continued)

(58) Field of Classification Search
CPC ................................................. H01M 50/367
See application file for complete search history.

(56) References Cited

U.S. PATENT DOCUMENTS

2021/0013471 A1* 1/2021 Honda ................. H01M 10/052
2021/0151815 A1* 5/2021 Milobar ............... H01M 50/264
2022/0131217 A1* 4/2022 Kim ............................ B32B 7/14

FOREIGN PATENT DOCUMENTS

CN 101411006 A 4/2009
CN 203481305 U 3/2014
(Continued)

OTHER PUBLICATIONS

Kobayashi, JP 2016062757 A Translation.*
(Continued)

*Primary Examiner* — Niki Bakhtiari
*Assistant Examiner* — Ryan E. Blackwell-Rudasill
(74) *Attorney, Agent, or Firm* — ANOVA LAW GROUP, PLLC

(57) ABSTRACT

The present application provides an energy storage system, including a first shell, a battery pack, a sealing member, a first explosion-proof valve and a second explosion-proof valve. The battery pack is arranged inside the first shell and includes a second shell and a battery. The sealing member is arranged between the first shell and the second shell, and a space between the first shell and the second shell is fluidly isolated from an inner space of the sealing member. The first explosion-proof valve is mounted on the second shell to communicate with an inner space of the second shell and the inner space of the sealing member when the first explosion-proof valve is opened. The second explosion-proof valve is mounted on the first shell to communicate with the inner space of the sealing member and an outer space of the first shell when the second explosion-proof valve is opened.

15 Claims, 4 Drawing Sheets

(51) Int. Cl.

| | |
|---|---|
| *H01M 50/204* | (2021.01) |
| *H01M 50/271* | (2021.01) |
| *H01M 50/30* | (2021.01) |
| *H01M 50/342* | (2021.01) |
| *H01M 50/383* | (2021.01) |

(52) U.S. Cl.

CPC ....... *H01M 50/30* (2021.01); *H01M 50/3425* (2021.01); *H01M 50/383* (2021.01); *H01M 50/204* (2021.01)

(56) References Cited

FOREIGN PATENT DOCUMENTS

| | | | |
|---|---|---|---|
| CN | 203707208 | U | 7/2014 |
| CN | 208240774 | U | 12/2018 |
| CN | 109698298 | A | 4/2019 |
| CN | 210073995 | U | 2/2020 |
| CN | 210296425 | U | 4/2020 |
| CN | 212584354 | U | 2/2021 |
| DE | 102012217383 | A1 | 3/2014 |
| DE | 102013203601 | A1 | 9/2014 |
| JP | 2012204193 | A | 10/2012 |
| JP | 2016062757 | A | * 4/2016 |
| KR | 20190090305 | A | * 8/2019 .......... B32B 15/085 |
| WO | 2014128909 | A1 | 8/2014 |

OTHER PUBLICATIONS

KR 20190090305A Original Document and Translation (Year: 2019).*

International Search Report and Written Opinion, PCT/CN2022/0732363, Oct. 10, 2022, 6 pgs.

The Japan Patent Office (JPO) Notification of Reasons for Refusal for Application No. 2022-552231 and Translation Mar. 11, 2024 7 Pages.

The European Patent Office (EPO) The Extended European Search Report for Application No. 22758111.3 Jan. 19, 2024 6 Pages.

* cited by examiner

ENERGY STORAGE SYSTEM

CROSS REFERENCE TO RELATED APPLICATION

This application is a continuation application of PCT Patent Application No. PCT/CN2022/073236, entitled "ENERGY STORAGE SYSTEM" filed on Jan. 21, 2022, which is incorporated herein by reference in its entirety.

TECHNICAL FIELD

The present application relates to the technical field of energy storage, and in particular relates to an energy storage system.

BACKGROUND

The rapid development of the new energy industry has promoted the progress of the energy storage industry. With the continuous development of energy storage products, energy storage technology has developed from small-capacity research to large-capacity applications. Large-scale energy storage products such as energy storage containers and mobile energy storage vehicles have come out one after another.

The safety of energy storage products is a key factor affecting the performance of energy storage products.

SUMMARY

The present application provides an energy storage system, which can effectively improve the safety of the energy storage system.

In a first aspect, the present application provides an energy storage system including a first shell;
  a battery pack, arranged inside the first shell, in which the battery pack includes a second shell and a battery arranged in the second shell;
  a sealing member, arranged between the first shell and the second shell, in which a space between the first shell and the second shell is fluidly isolated from an inner space of the sealing member;
  a first explosion-proof valve, mounted on the second shell to communicate with an inner space of the second shell and the inner space of the sealing member when the first explosion-proof valve is opened; and
  a second explosion-proof valve, mounted on the first shell to communicate with the inner space of the sealing member and an outer space of the first shell when the second explosion-proof valve is opened.

By arranging the sealing member, the fluid sealing between the first shell and the second shell can be achieved, so that the space between the first shell and the second shell is fluidly isolated from the inner space of the sealing member. When the thermal runaway of the battery occurs, the fluid entering the inner space of the sealing member through the first explosion-proof valve will not leak into the space between the first shell and the second shell, thereby preventing pressure in the space between the first shell and second shell from increasing or even causing an explosion, so that it can effectively improve the security of the energy storage system.

In some embodiments, the second explosion-proof valve is configured to be opened when a pressure of the inner space of the sealing member is greater than an opening pressure of the second explosion-proof valve. In the embodiments, a connecting member may not be arranged between the first explosion-proof valve and the second explosion-proof valve. The opening of the second explosion-proof valve depends on the pressure of the inner space of the sealing member. After the first explosion-proof valve is opened, the gas inside the battery will enter the inner space of the sealing member through the first explosion-proof valve, so that the pressure of the inner space of the sealing member can increase; when the pressure of the inner space of the sealing member increases to reach the opening pressure of the second explosion-proof valve, the second explosion-proof valve will be opened.

In some embodiments, the energy storage system further includes a connecting member. The connecting member is connected between the first explosion-proof valve and the second explosion-proof valve, so that the second explosion-proof valve is linked with the first explosion-proof valve.

By arranging the connecting member, a linkage between the second explosion-proof valve and the first explosion-proof valve can be realized, that is, when the first explosion-proof valve is opened, the first explosion-proof valve will drive the second explosion-proof valve to open at the same time through the connecting member, so as to realize the purpose of discharging the gas in the sealing member in time and prevent the gas from accumulating in the sealing member and causing explosion. The advantage of the embodiment is that even if the sealing member leaks fluid during use due to some reasons, the second explosion-proof valve can be opened in time as the state of the first explosion-proof valve changes, and the pressure can be released quickly.

In some embodiments, the first explosion-proof valve includes a first valve body and a first valve core; when the first explosion-proof valve is in an opening state, the first valve core moves relative to the first valve body to communicate with the inner space of the second shell and the inner space of the sealing member; the second explosion-proof valve includes a second valve body and a second valve core; when the second explosion-proof valve is in an opening state, the second valve core moves relative to the second valve body to communicate with the inner space of the sealing member and the outer space of the first shell; the connecting member is connected between the first valve core and the second valve core.

When the first explosion-proof valve is opened, the first valve core moves relative to the first valve body in a direction close to the second explosion-proof valve to open a pressure-relief opening, so that the gas can be discharged to the inner space of the sealing member through the pressure-relief opening. When the first valve core moves relative to the first valve body, the second valve core is driven to move in a direction away from the first explosion-proof valve through the connecting member, thereby opening the pressure-relief opening of the second explosion-proof valve, so that the gas inside the sealing member can be discharged to the outside of the first shell, and the purpose of pressure relief can be achieved.

In some embodiments, the connecting member includes a rigid rod. The advantage of using the rigid rod is that when the first valve core moves, the second valve core can be directly driven to start synchronous movement through the connecting member, so as to prevent the occurrence of linkage delay.

In some embodiments, the energy storage system further includes a first sealing gasket arranged between the first explosion-proof valve and the second shell and a second sealing gasket arranged between the second explosion-proof valve and the first shell.

By arranging the first sealing gasket and the second sealing gasket, the sealing effect between the first explosion-proof valve and the second shell and the sealing effect between the second explosion-proof valve and the first shell can be enhanced to prevent the leakage of the gas in the inner space of the sealing member.

In some embodiments, the energy storage system further includes a first thermal insulation member. The first thermal insulation member is mounted on an inner wall of the first shell, and the sealing member passes through the first thermal insulation member.

By arranging the first thermal insulation member, the thermal insulation function of the energy storage system can be realized, and the energy storage system can be prevented from being affected by the temperature of the external environment.

In some embodiments, the energy storage system further includes a second thermal insulation member. A thickness of the first thermal insulation member is smaller than a distance between the first shell and the second shell, and the second thermal insulation member is arranged on an outer periphery of the sealing member and is located between the first thermal insulation member and the second shell.

Since the sealing member passes through the first thermal insulation member, there is no first thermal insulation member at the sealing member for thermal insulation. By arranging the second thermal insulation member, a portion between the sealing member and the second shell can be thermally insulated, so as to prevent the first shell from reducing the thermal insulation effect due to arranging the second explosion-proof valve.

In some embodiments, a hardness of the second thermal insulation member is smaller than a hardness of the first thermal insulation member. In this way, the second thermal insulation member can be properly compressed according to an actual distance between the first shell and the second shell, so as to fill the space between the first shell and the second shell, and ensure the thermal insulation effect.

In some embodiments, the first thermal insulation member includes a rock wool, and/or the second thermal insulation member includes a thermal insulation foam.

The above description is only an overview of the technical solution of the present application. In order to understand the technical means of the present application more clearly, it can be implemented according to the content of the description, and in order to make the above-mentioned and other objects, features and advantages of the present application more clearly understood, the following specific embodiments of the present application are given.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

Figure 1:
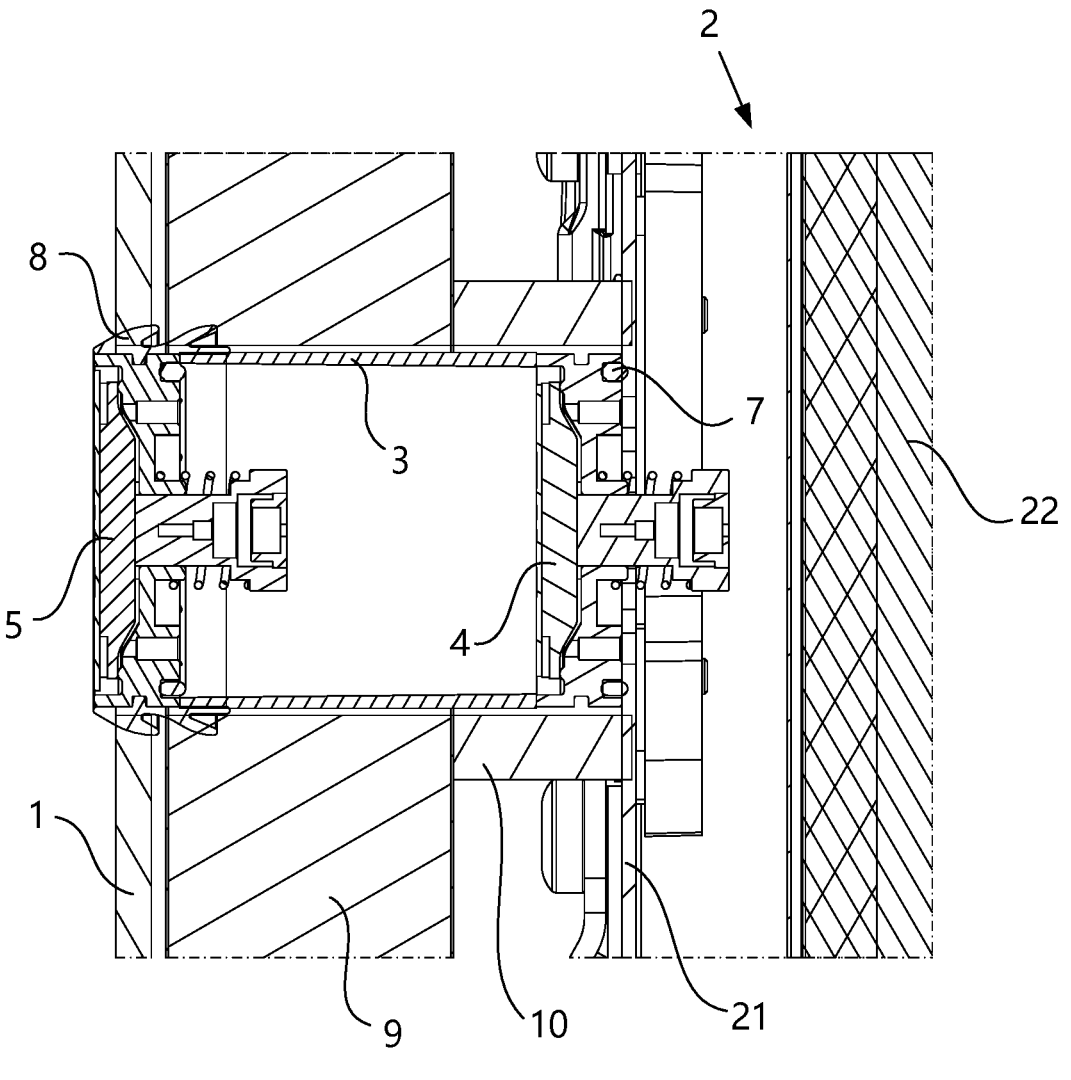
FIG. 1 shows a schematic structural view of an energy storage system disclosed in some embodiments of the present application when a first explosion-proof valve and a second explosion-proof valve are in a closed state.

In the drawings, the drawings are not drawn to actual scale. Reference number:

1. first shell; 2. battery pack; 21. second shell; 22. battery; 3. sealing member; 4. first explosion-proof valve; 41. first valve body; 42. first valve core; 5. second explosion-proof valve; 51. second valve body; 52. second valve core; 6. connecting member; 7. first sealing gasket; 8. second sealing gasket; 9. first thermal insulation member; 10. second thermal insulation member.

DETAILED DESCRIPTION

The implementation of the present application will be described in further detail below in conjunction with the drawings and embodiments. The following embodiments are only used to illustrate the technical solutions of the present application more clearly, and are therefore only used as examples, and cannot be used to limit the protection scope of the present application.

Unless otherwise defined, all technical and scientific terms used herein have the same meaning as commonly understood by those skilled in the technical filed to which the present application belongs. The terminology used herein is for the purpose of describing particular embodiments only and is not intended to limit the present application. The terms "comprising" and "having" and any variations thereof in the description and claims of the present application and the above description of the drawings are intended to cover non-exclusive inclusions.

In the description of the embodiments of the present application, the technical terms "first", "second" and the like are only used to distinguish different objects, and should not be understood as indicating or implying relative importance or implying the quantity, specific order or priority relationship of the indicated technical features. Furthermore, the term "perpendicular" does not mean strictly perpendicular, but allows for an error within the allowable range. The term "parallel" does not mean strictly parallel, but allows for an error within the allowable range.

The "embodiment" referred in the present application means that a particular feature, a structure, or a characteristic described in connection with the embodiment can be included in at least one embodiment of the present application. The appearances of the phrase in various positions in the specification are not necessarily all referring to the same embodiment, nor a separate or alternative embodiment that is mutually exclusive of other embodiments. It is explicitly and implicitly understood by those skilled in the art that the embodiments described in the present application may be combined with other embodiments.

In the description of the present application, the term "and/or" is merely an association to describe the associated objects. It can mean that there are three kinds of relationships, such as A and/or B, which means that A exists alone, A and B exist at the same time, and B exists alone. In addition, the character "/" in the present application generally indicates that the related objects are an "or" relationship.

In the description of the present application, the term "plurality" means two or more, unless expressly specifically defined otherwise. Similarly, "a plurality of groups" means two or more groups, and "a plurality of sheets" refers to two or more sheets, unless otherwise specifically defined.

In the description of the present application, the technical terms "center", "longitudinal", "transverse", "length", "width", "thickness", "top", "bottom", "front", "rear", "left", "right", "vertical", "horizontal", "top", "bottom", "inside", "outside", "clockwise", "counterclockwise", "axial", "radial", "circumferential" and the like indicating the orientation or positional relationship are based on the orientation or positional relationship shown in the drawings, and are only for the convenience of describing the embodiments of the present application and simplifying the description, rather than indicating or implying that the referred device or element must have a specific direction or position or be constructed and operate in a specific direction or position. Therefore, it cannot be construed as a limitation on the embodiments of the present application.

In the description of the present application, unless otherwise clearly specified and limited, the terms "mount", "communicate", "connect" and "fix" should be understood in a broad sense, for example, it can be a fixed connection, a detachable connection, or an integral connection, it can be a mechanical connection or an electrical connection; it can be a direct connection, or it can be connected indirectly through an intermediary, it can be a communication within the two elements or an interaction relationship between the two elements. For those of ordinary skill in the art, the specific meaning of the above-mentioned terms in the present application can be understood according to specific situations.

With the promotion and application of new energy sources such as solar energy and wind energy, the energy storage technology has also developed. Due to the advantages of high energy, long service life, high rated voltage, high power tolerance, low self-discharge rate, light weight, green environmental protection and basically no water consumption in production, power batteries are gradually being used in energy storage power systems such as hydropower, thermal power, wind power and solar power plants.

The inventors of the present application have noticed that a plurality of battery packs are arranged in an energy storage system, and a battery is arranged in the battery pack. When the thermal runaway of the battery occurs, gas inside the battery is directly discharged into the battery pack through an explosion-proof valve, and the combustible gas may cause the deflagration and explosion of the battery pack.

In order to improve the safety of the energy storage system and prevent the energy storage system from exploding when the thermal runaway of the battery pack occurs, the inventor has improved the structure of the energy storage system.

As shown in FIGS. 1 to 4, in some embodiments of an energy storage system provided by the present application, the energy storage system includes a first shell 1, a battery pack 2, a sealing member 3, a first explosion-proof valve 4 and a second explosion-proof valve 5. The battery pack 2 is arranged inside the first shell 1. The battery pack 2 includes a second shell 21 and a battery 22 arranged in the second shell 21. The sealing member 3 is arranged between the first shell 1 and the second shell 21, and a space between the first shell 1 and the second shell 21 is fluidly isolated from an inner space of the sealing member 3. The first explosion-proof valve 4 is mounted on the second shell 21 to communicate with an inner space of the second shell 21 and the inner space of the sealing member 3 when the first explosion-proof valve 4 is opened. The second explosion-proof valve 5 is mounted on the first shell 1 to communicate with the inner space of the sealing member 3 and an outer space of the first shell 1 when the second explosion-proof valve 5 is opened.

By arranging the sealing member 3, the fluid sealing between the first shell 1 and the second shell 21 can be achieved, so that the space between the first shell 1 and the second shell 21 is fluidly isolated from the inner space of the sealing member 3. When the thermal runaway of the battery 22 occurs, the fluid entering the inner space of the sealing member 3 through the first explosion-proof valve 4 will not leak into the space between the first shell 1 and the second shell 21, thereby preventing pressure in the space between the first shell 1 and second shell 21 from increasing or even causing an explosion, so that it can effectively improve the security of the energy storage system.

The sealing member 3 forms a directional smoke exhaust channel when thermal runaway occurs in the battery 22, so that the pressure inside the battery can be released in time.

The fluid entering the inner space of the sealing member 3 through the first explosion-proof valve 4 can continue to press the second explosion-proof valve 5 and flow out of the first shell 1 after the second explosion-proof valve 5 is opened to realize the pressure relief of the battery 22.

The structures of the first explosion-proof valve 4 and the second explosion-proof valve 5 may be the same or different.

In some embodiments, the sealing member 3 may be a sleeve structure, two ends of the sealing member 3 are respectively connected with the first shell 1 and the second shell 21, and the first explosion-proof valve 4 and the second explosion-proof valve 5 are respectively located at the two ends of the sealing member 3. The sealing member 3 may be connected with the first explosion-proof valve 4 and the second explosion-proof valve 5 by welding or bolt connection.

In some embodiments, the first shell 1 and the second shell 21 are made of a hard material. The first shell 1 and the second shell 21 may be cylinder, cuboid or other shapes.

Figure 2:
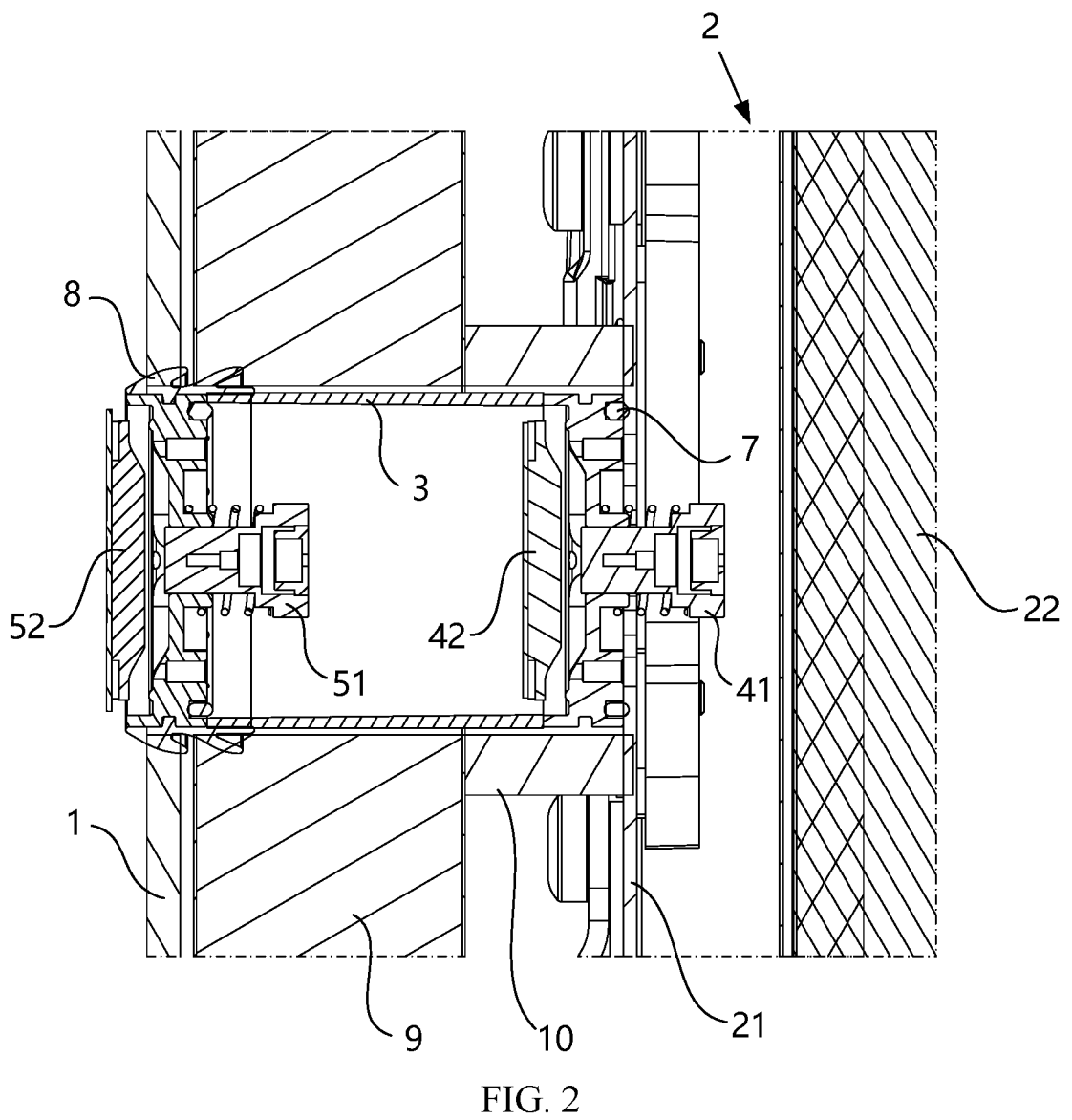
FIG. 2 shows a schematic structural view of an energy storage system disclosed in some embodiments of the present application when a first explosion-proof valve and a second explosion-proof valve are in an opening state.

As shown in FIG. 1 and FIG. 2, in some embodiments, the second explosion-proof valve 5 is configured to be opened when a pressure of the inner space of the sealing member 3 is greater than an opening pressure of the second explosion-proof valve 5. In the embodiments, a connecting member may not be arranged between the first explosion-proof valve 4 and the second explosion-proof valve 5. The opening of the second explosion-proof valve 5 depends on the pressure of the inner space of the sealing member 3. After the first explosion-proof valve 4 is opened, the gas inside the battery 22 will enter the inner space of the sealing member 3 through the first explosion-proof valve 4, so that the pressure of the inner space of the sealing member 3 can increase; when the pressure of the inner space of the sealing member 3 increases to reach the opening pressure of the second explosion-proof valve 5, the second explosion-proof valve 5 will be opened.

Figure 3:
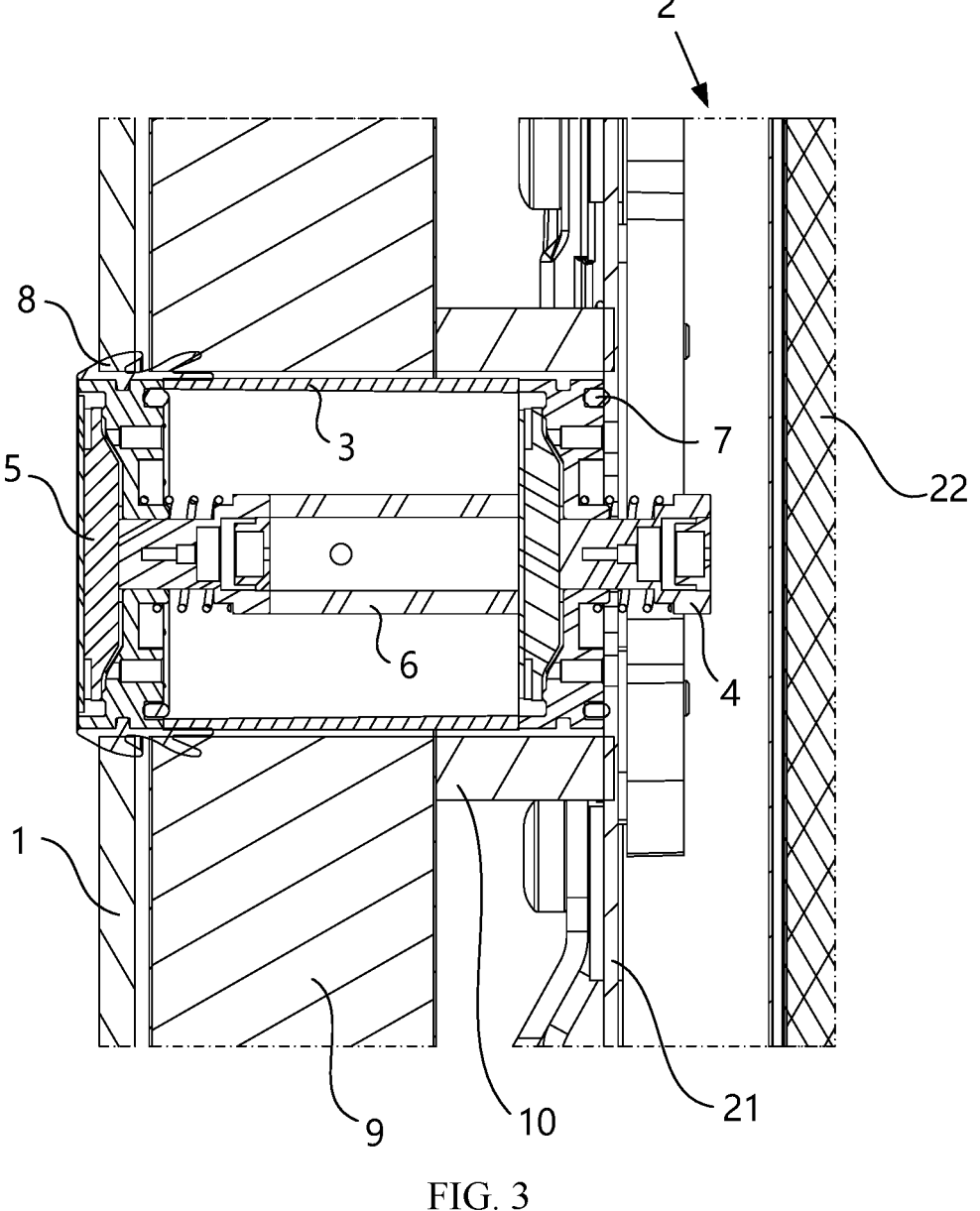
FIG. 3 shows a schematic structural view of an energy storage system disclosed in some other embodiments of the present application when a first explosion-proof valve and a second explosion-proof valve are in a closed state.
Figure 4:
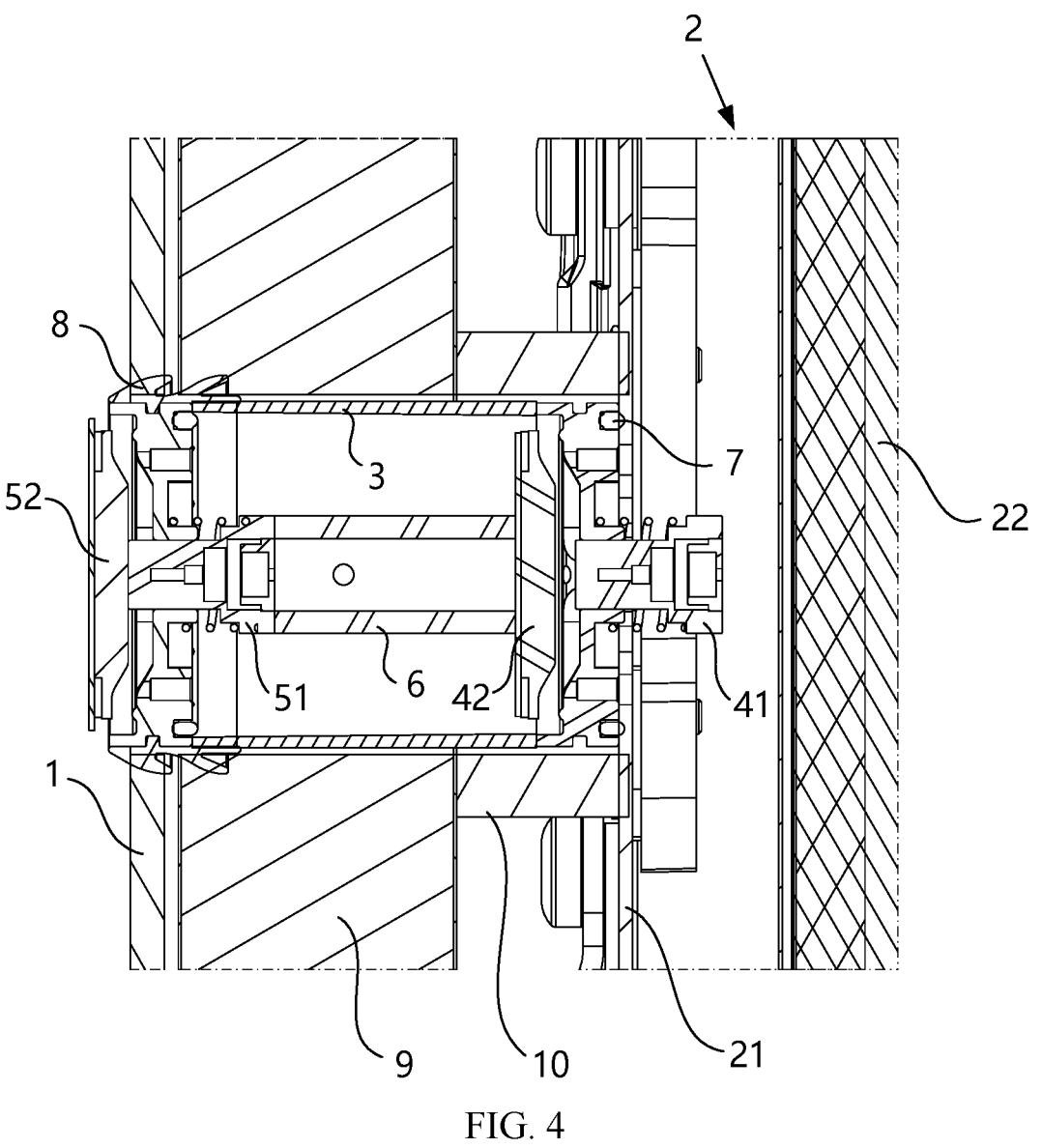
FIG. 4 shows a schematic structural view of an energy storage system disclosed in some other embodiments of the present application when a first explosion-proof valve and a second explosion-proof valve are in an opening state.

As shown in FIG. 3 and FIG. 4, in some embodiments, the energy storage system further includes a connecting member 6. The connecting member 6 is connected between the first explosion-proof valve 4 and the second explosion-proof valve 5, so that the second explosion-proof valve 5 is linked with the first explosion-proof valve 4. By arranging the connecting member 6, a linkage between the second explosion-proof valve 5 and the first explosion-proof valve 4 can be realized, that is, when the first explosion-proof valve 4 is opened, the first explosion-proof valve 4 will drive the second explosion-proof valve 5 to open at the same time through the connecting member 6, so as to realize the purpose of discharging the gas in the sealing member 3 in time and prevent the gas from accumulating in the sealing member 3 and causing explosion. The advantage of the embodiment is that even if the sealing member 3 leaks fluid during use due to some reasons, the second explosion-proof valve 5 can be opened in time as the state of the first explosion-proof valve 4 changes, and the pressure can be released quickly.

In some embodiments, the first explosion-proof valve 4 includes a first valve body 41 and a first valve core 42; when the first explosion-proof valve 4 is in an opening state, the first valve core 42 moves relative to the first valve body 41 to communicate with the inner space of the second shell 21 and the inner space of the sealing member 3; the second explosion-proof valve 5 includes a second valve body 51 and a second valve core 52; when the second explosion-proof valve 5 is in an opening state, the second valve core 52 moves relative to the second valve body 51 to communicate with the inner space of the sealing member 3 and the outer space of the first shell 1; the connecting member 6 is connected between the first valve core 42 and the second valve core 52.

When the first explosion-proof valve 4 is opened, the first valve core 42 moves relative to the first valve body 41 in a direction close to the second explosion-proof valve 5 to open a pressure-relief opening, so that the gas can be discharged to the inner space of the sealing member 3 through the pressure-relief opening. When the first valve core 42 moves relative to the first valve body 41, the second valve core 52 is driven to move in a direction away from the first explosion-proof valve 4 through the connecting member 6, thereby opening the pressure-relief opening of the second explosion-proof valve 5, so that the gas inside the sealing member 3 can be discharged to the outside of the first shell 1, and the purpose of pressure relief can be achieved.

In some embodiments, the connecting member 6 includes a rigid rod. The advantage of using the rigid rod is that when the first valve core 42 moves, the second valve core 52 can be directly driven to start synchronous movement through the connecting member 6, so as to prevent the occurrence of linkage delay.

For example, the connecting member 6 may be a cylindrical rod member.

In some embodiments, a through hole is arranged in a center of the connecting member 6. The through hole can not only facilitate the connection with the first valve core 42 and the second valve core 52, but also reduce the total weight of the connecting member 6.

In each of the above embodiments, the first explosion-proof valve 4 and the second explosion-proof valve 5 may adopt a one-way explosion-proof valve or a balanced explosion-proof valve.

In some embodiments, the energy storage system further includes a first sealing gasket 7 arranged between the first explosion-proof valve 4 and the second shell 21 and a second sealing gasket 8 arranged between the second explosion-proof valve 5 and the first shell 1.

By arranging the first sealing gasket 7 and the second sealing gasket 8, the sealing effect between the first explosion-proof valve 4 and the second shell 21 and the sealing effect between the second explosion-proof valve 5 and the first shell 1 can be enhanced to prevent the leakage of the gas in the inner space of the sealing member 3.

The structures of the first sealing gasket 7 and the second sealing gasket 8 may be the same or different.

In the embodiments shown in FIGS. 1 to 4, the first sealing gasket 7 includes an O-shaped rubber ring. A side face of the first valve body 41 close to the second shell 21 is provided with a groove, and the O-shaped rubber ring is arranged in the groove. The side face of the first valve body 41 close to the second shell 21 is in contact with an outer wall of the second shell 21.

The second sealing gasket 8 includes a rubber ring, and the rubber ring includes a portion, in which an outer diameter of the portion gradually increases in the direction from the first shell 1 to the second shell 21. A mounting hole is arranged on the first shell 1. During assembly, the rubber ring can be mounted at the mounting hole of the first shell 1 from an interior of the first shell 1 to the outside, so as to prevent the rubber ring from falling to the outside of the first shell 1. The rubber ring is sleeved on an outer periphery of the second explosion-proof valve 5 to prevent the gas in the space between the first shell 1 and the second shell 21 from leaking out through a mounting gap of the second explosion-proof valve 5.

In some embodiments, the energy storage system further includes a first thermal insulation member 9. The first thermal insulation member 9 is mounted on an inner wall of the first shell 1, and the sealing member 3 passes through the first thermal insulation member 9.

By arranging the first thermal insulation member 9, the thermal insulation function of the energy storage system can be realized, and the energy storage system can be prevented from being affected by the temperature of the external environment.

In some embodiments, the first thermal insulation member 9 covers the entire inner wall of the first shell 1 to achieve the overall and comprehensive thermal insulation for the inner space of the first shell 1.

In some embodiments, the first thermal insulation member 9 includes a rock wool. The structure of rock wool is relatively easy to fix, and has better thermal insulation effect.

The first thermal insulation member 9 can be mounted on the inner wall of the first shell 1 by the connecting member such as a bolt or the like.

In some embodiments, the energy storage system further includes a second thermal insulation member 10. A thickness of the first thermal insulation member 10 is smaller than a distance between the first shell 1 and the second shell 21, and the second thermal insulation member 10 is arranged on an outer periphery of the sealing member 3 and is located between the first thermal insulation member 9 and the second shell 21.

Since the sealing member 3 passes through the first thermal insulation member 9, there is no first thermal insulation member 9 at the sealing member 3 for thermal insulation. By arranging the second thermal insulation member 10, a portion between the sealing member 3 and the second shell 21 can be thermally insulated, so as to prevent the first shell 1 from reducing the thermal insulation effect due to arranging the second explosion-proof valve 5.

In some embodiments, a hardness of the second thermal insulation member 10 is smaller than a hardness of the first thermal insulation member 9. In this way, the second thermal insulation member 10 can be properly compressed according to an actual distance between the first shell 1 and the second shell 21, so as to fill the space between the first shell 1 and the second shell 21, and ensure the thermal insulation effect.

In some embodiments, the second thermal insulation member 10 includes a thermal insulation foam. The hardness of thermal insulation foam is smaller than that of rock wool, and the thermal insulation foam has a certain compressibility, which is suitable for filling the space with an uncertain gap.

The energy storage system provided by the present application may be an energy storage container or a mobile energy storage vehicle.

Reference to FIGS. 1-4, the structures of some embodiments of the energy storage system provided by the present application will be described.

As shown in FIG. 1 and FIG. 2, the energy storage system includes the first shell 1, the battery pack 2, the sealing member 3, the first explosion-proof valve 4, the second explosion-proof valve 5, the first sealing gasket 7, the second sealing gasket 8, the first thermal insulation member 9 and the second thermal insulation member 10.

The interior of the first shell 1 is provided with a plurality of battery packs 2, an electrical room and a water-cooling room for cooling the battery packs 2, and the like.

The battery pack 2 includes the second shell 21 and the battery 22 arranged in the second shell 21. The first explosion-proof valve 4 is mounted on the second shell 21. The second explosion-proof valve 5 is mounted on the first shell 1. The sealing member 3 is arranged between the first shell 1 and the second shell 21, and is connected between the first explosion-proof valve 4 and the second explosion-proof valve 5.

The first sealing gasket 7 is arranged between the first explosion-proof valve 4 and the second shell 21, and the second sealing gasket 8 is arranged between the second explosion-proof valve 5 and the first shell 1. The first thermal insulation member 9 is mounted on the inner wall of the first shell 1, and the second thermal insulation member 10 is arranged on the outer periphery of the sealing member 3 and is located between the first thermal insulation member 9 and the second shell 21.

The energy storage system in the embodiments can directly discharge the gas to the outside of the first shell 1 through the first explosion-proof valve 4 and the second explosion-proof valve 5 when the thermal runaway of the battery 22 occurs, and the energy storage system can have the thermal insulation function to adapt to application scenarios that require thermal insulation.

In this embodiment, the inner space of the sealing member 3 stores the air. When the first explosion-proof valve 4 is opened, the gas inside the battery enters the sealing member 3, and the pressure inside the sealing member 3 continuously increases. When the opening pressure of the second explosion-proof valve 5 is reached, the second explosion-proof valve 5 is opened, and the gas inside the battery is directly discharged to the outside of the first shell 1 to realize pressure relief.

In the embodiments shown in FIG. 3 and FIG. 4, the connecting member 6 is added relative to the embodiment shown in FIG. 1 and FIG. 2. The connecting member 6 is connected between the first valve core 42 of the first explosion-proof valve 4 and the second valve core 52 of the second explosion-proof valve 5. When the first explosion-proof valve 4 is opened under pressure, the displacement of the first explosion-proof valve 4 is transmitted to the second explosion-proof valve 5 through the connecting member 6, so that the second valve core 52 of the second explosion-proof valve 5 is opened under the force, so that the purposes of the linkage opening and pressure relief can be achieved.

Similarly, the energy storage system in the embodiments can also directly discharge the gas to the outside of the first shell 1 through the first explosion-proof valve 4 and the second explosion-proof valve 5 when the thermal runaway of the battery 22 occurs, and the energy storage system can have the thermal insulation function to adapt to application scenarios that require thermal insulation.

While the present application has been described with reference to the embodiments, various modifications may be made to the embodiments and equivalents may be substituted for elements thereof without departing from the scope of the present application. In particular, as long as there is no structural conflict, various technical features mentioned in the embodiments can be combined in any manner. The present application is not limited to the specific embodiments disclosed herein, but includes all technical solutions falling within the scope of the claims.

What is claimed is:

1. An energy storage system, comprising:
a first shell;
a battery pack, arranged inside the first shell, wherein the battery pack comprises a second shell and a battery arranged in the second shell;
a sealing member, arranged between the first shell and the second shell, wherein a space between the first shell and the second shell is fluidly isolated from an inner space of the sealing member;
a first explosion-proof valve, mounted on the second shell to communicate with an inner space of the second shell and the inner space of the sealing member when the first explosion-proof valve is opened;
a second explosion-proof valve, mounted on the first shell to communicate with the inner space of the sealing member and an outer space of the first shell when the second explosion-proof valve is opened; and
a first thermal insulation member, wherein the first thermal insulation member is mounted on an inner wall of the first shell, and the sealing member passes through the first thermal insulation member.

2. The energy storage system according to claim 1, wherein the second explosion-proof valve is configured to be opened when a pressure of the inner space of the sealing member is greater than an opening pressure of the second explosion-proof valve.

3. The energy storage system according to claim 2, further comprising a connecting member, wherein the connecting member is connected between the first explosion-proof valve and the second explosion-proof valve, and the second explosion-proof valve is linked with the first explosion-proof valve.

4. The energy storage system according to claim 1, further comprising a connecting member, wherein the connecting member is connected between the first explosion-proof valve and the second explosion-proof valve, and the second explosion-proof valve is linked with the first explosion-proof valve.

5. The energy storage system according to claim 4, wherein the first explosion-proof valve comprises a first valve body and a first valve core; when the first explosion-proof valve is in an opening state, the first valve core moves relative to the first valve body to communicate with the inner space of the second shell and the inner space of the sealing member; the second explosion-proof valve comprises a second valve body and a second valve core; when the second explosion-proof valve is in an opening state, the second valve core moves relative to the second valve body to communicate with the inner space of the sealing member and the outer space of the first shell; and the connecting member is connected between the first valve core and the second valve core.

6. The energy storage system according to claim 4, wherein the connecting member comprises a rigid rod.

7. The energy storage system according to claim 5, wherein the connecting member comprises a rigid rod.

8. The energy storage system according to claim 1, further comprising a first sealing gasket arranged between the first explosion-proof valve and the second shell and a second sealing gasket arranged between the second explosion-proof valve and the first shell.

9. The energy storage system according to claim 2, further comprising a first sealing gasket arranged between the first explosion-proof valve and the second shell and a second sealing gasket arranged between the second explosion-proof valve and the first shell.

10. The energy storage system according to claim 3, further comprising a first sealing gasket arranged between the first explosion-proof valve and the second shell and a second sealing gasket arranged between the second explosion-proof valve and the first shell.

11. The energy storage system according to claim 5, further comprising a first sealing gasket arranged between the first explosion-proof valve and the second shell and a second sealing gasket arranged between the second explosion-proof valve and the first shell.

12. The energy storage system according to claim 6, further comprising a first sealing gasket arranged between the first explosion-proof valve and the second shell and a second sealing gasket arranged between the second explosion-proof valve and the first shell.

13. The energy storage system according to claim 1, further comprising a second thermal insulation member, wherein a thickness of the first thermal insulation member is smaller than a distance between the first shell and the second shell, and the second thermal insulation member is arranged on an outer periphery of the sealing member and is located between the first thermal insulation member and the second shell.

14. The energy storage system according to claim 13, wherein a hardness of the second thermal insulation member is smaller than a hardness of the first thermal insulation member.

15. The energy storage system according to claim 13, wherein the first thermal insulation member comprises a rock wool, and/or the second thermal insulation member comprises a thermal insulation foam.

\* \* \* \* \*